United States Patent
Hansen

(10) Patent No.: US 7,128,936 B1
(45) Date of Patent: Oct. 31, 2006

(54) PROCESS AND APPARATUS FOR AGGLOMERATION OF POWDERS

(75) Inventor: Ove Emil Hansen, Allerød (DK)

(73) Assignee: Niro A/S, Soborg (DK)

( * ) Notice: Subject to any disclaimer, the term of this patent is extended or adjusted under 35 U.S.C. 154(b) by 0 days.

(21) Appl. No.: 10/169,788

(22) PCT Filed: Jan. 12, 2000

(86) PCT No.: PCT/DK00/00009

§ 371 (c)(1),
(2), (4) Date: Oct. 29, 2002

(87) PCT Pub. No.: WO00/21654

PCT Pub. Date: Apr. 20, 2000

(51) Int. Cl.
A23C 9/00 (2006.01)

(52) U.S. Cl. .................. 426/285; 426/294; 426/454; 426/453; 426/455

(58) Field of Classification Search ............ 426/285, 426/294, 295, 453, 454, 455
See application file for complete search history.

(56) References Cited

U.S. PATENT DOCUMENTS 3,966,975 A  6/1976  Hansen et al.
4,157,371 A  6/1979  Paulson et al.
4,777,056 A * 10/1988  Buhler et al. ............... 426/285
5,831,123 A * 11/1998  Gergely et al. ............ 562/584

FOREIGN PATENT DOCUMENTS

| EP | 0 204 256 B1 | 12/1986 |
| EP | 0 337 094 A1 | 10/1989 |
| EP | 0 407 325 A1 | 1/1991 |
| GB | 1248310 | 6/1969 |
| GB | 1 448 031 | 9/1976 |
| SE | 7311222-9 | 7/1975 |

* cited by examiner

Primary Examiner—Lien Tran
(74) Attorney, Agent, or Firm—Sughrue Mion, PLLC

(57) ABSTRACT

A process and an apparatus for agglomeration of powders wherein the powder is brought into contact with an agglomeration fluid while being air-borne and collected on a surface all parts of which are moving at substantially the same speed, after which the agglomerated powder is moved away from the moving surface by means of a centrifugal acceleration of at least 50 $m/s^2$.

21 Claims, 3 Drawing Sheets

PROCESS AND APPARATUS FOR AGGLOMERATION OF POWDERS

Figure 1:
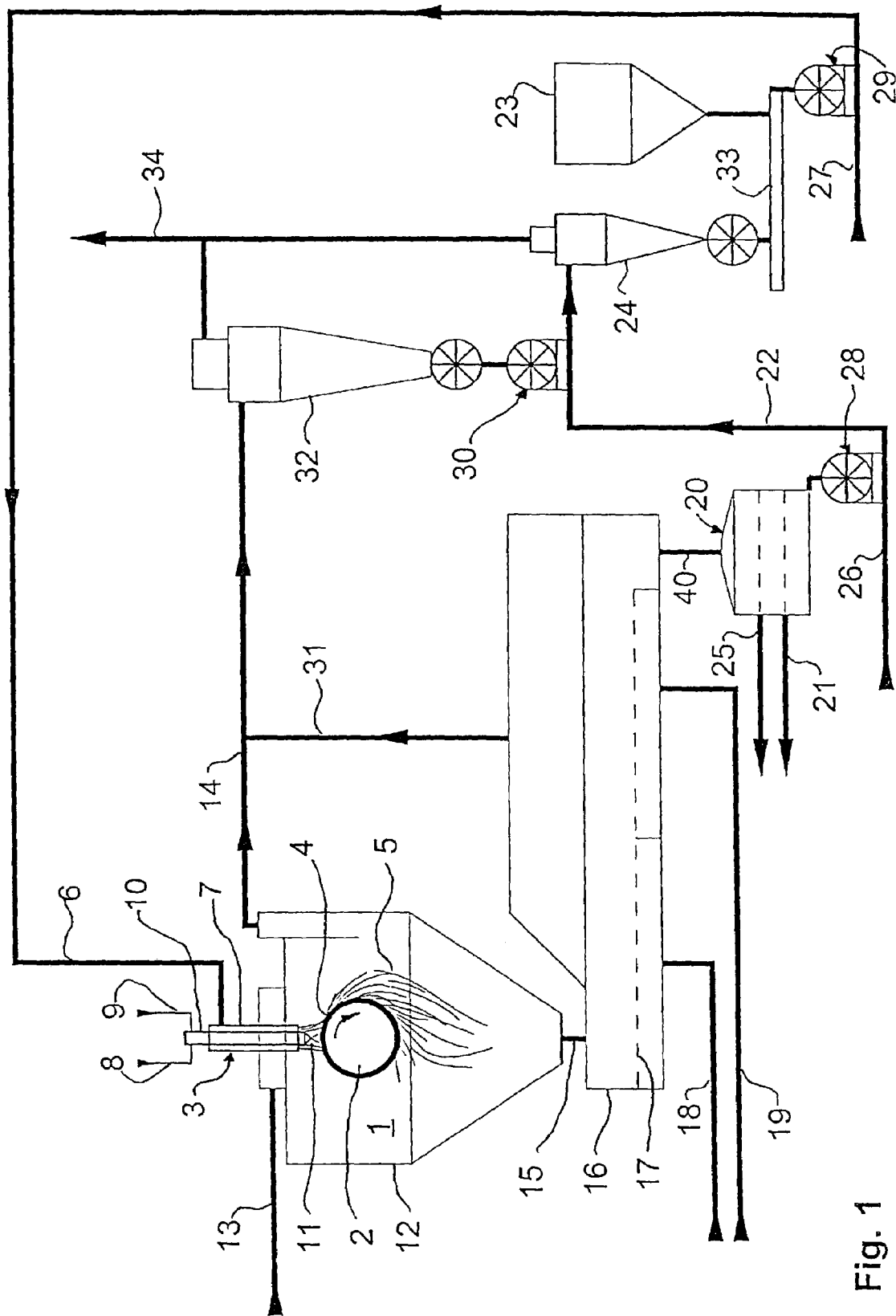

The present invention relates to a process and an apparatus for agglomeration of powders, particularly food products, such as instant coffee, coffee substitutes, tea, vegetable proteins, milk and milk-like products etc., but also products such as dyestuffs and agrochemicals, by a process of the kind generally known as rewet-agglomeration.

A method and an apparatus of this kind for producing agglomerated soluble coffee or coffee substitute powder products, whereby a powder of the raw materials which is dropped towards a rotating disc while being moistened, the powder of the raw materials being moistened with an aqueous moistening agent in an amount sufficient to cause agglomeration of the raw materials and the disc rotating with a speed sufficient to cause the moistened raw materials to be thrown off the disc by centrifugal force, is known from U.S. Pat. No. 3,966,975 (Niro), the contents of which is incorporated herein by reference.

The process and apparatus according to U.S. Pat. No. 3,966,975 have found widespread use during the years. They are simple in operation, yet have certain drawbacks. Due to the fact that different parts of the rotating disc move at different speeds, a wide distribution of sizes of the agglomerated particles are obtained. This means that a large fraction of off-size particles will normally have to be recirculated in order to obtain a reasonable efficiency of the process. However, the accompanying repeated rewetting and drying of the recirculated product will impair the product quality. A further drawback is that the construction of the apparatus makes it unsuitable for upscaling due to practical limits on the capacity of the nozzle.

The present invention relates to an improvement of the process and apparatus according to the above-mentioned US patent, whereby the drawbacks mentioned above are alleviated.

Accordingly the present invention provides a process for agglomeration of powders, wherein the powder to be agglomerated is brought into contact with an agglomeration fluid while being directed towards a moving surface onto which the powder being agglomerated is collected and the powder being agglomerated subsequently moved away from the moving surface by influence of centrifugal force and optionally dried, which process is characterized in that all parts of the moving surface are moving at substantially the same speed and that the agglomerated powder is moved away from the moving surface by means of a centrifugal acceleration of at least 50 m/s$^2$.

Through the feature that all parts of the moving surface are moving at substantially the same speed, a more uniform distribution of the size of the agglomerated particles is obtained, resulting in a reduced recirculation rate and a better product quality. In addition the speed of the moving surface becomes an adequate parameter for controlling the size of the agglomerated particles.

The agglomerated powder is removed from the moving surface by influence of a centrifugal acceleration of at least 50 m/s$^2$, typically a centrifugal acceleration in the range from 50–5000 m/s$^2$, particularly in the range from 100–2500 m/s$^2$, and more particularly in the range from 200–1250 m/s$^2$. Hereby the agglomerated powder is obtained directly in a substantially particulate form, contrary to certain other processes known in the art wherein the agglomerated powder is obtained as a cake which subsequently has to be broken by mechanical means.

The moving surface will typically be moving at a speed of at least 2.5 m/s, particularly at a speed of at least 3.5 m/s and more particularly at a speed of at least 5.0 m/s. The speed of the moving surface is preferably adjustable so as to allow adjustment of the particle size of the agglomerated powder.

The invention also provides an apparatus for agglomeration of powders, which apparatus comprises a movable surface for collection of the powder being agglomerated, means for bringing the powder to be agglomerated into contact with one or more agglomeration fluids while being directed towards the movable surface, means for moving the movable surface and optionally means for drying the agglomerated powder, the movable surface having such configuration that the collected powder being agglomerated is moved away from the moving surface by influence of centrifugal force when the apparatus is in operation. The apparatus is characterized in that the movable surface has such configuration that all parts thereof are moving at substantially the same speed when the apparatus is in operation, and that the apparatus is adapted to provide the collected powder being agglomerated with a centrifugal acceleration of at least 50 m/s$^2$ so as to move it away from the moving surface.

Means for bringing a powder to be agglomerated into contact with one or more agglomeration fluids such as water, a solution of the powder at issue, steam (saturated or superheated) or a combination thereof, while the powder is airborne, are known in the art, cf. e.g. the aforementioned U.S. Pat. No. 3,966,975 and EP-B-0 204 256. All such means will also be applicable in the process and the apparatus according to the invention as long as they are compatible with the product in question and any other features of the process and apparatus at issue. In general they consist of a combination of inlets or other means for distributing the powder over a moistening zone and means for atomizing the agglomeration fluid(s) so as to bring the atomized agglomeration fluid(s) into contact with the powder. As examples of atomizing means, pressure or air atomizing nozzles may be mentioned. The configuration of the means for bringing the powder to be agglomerated into contact with the agglomeration fluid(s) while the powder is directed towards the movable surface is not crucial as long as an adequate contact is established without undue soiling of the equipment. More sets of means may be provided so as to cover a larger moving surface. In case of more means being provided they will normally be distributed side by side in a direction essentially perpendicular to the direction of movement of the moving surface so as to provide an adequate distribution over the surface. The means for bringing the powder to be agglomerated into contact with the agglomeration fluid(s) may also be in the form of adjacent oblong slits for introduction of powder and agglomeration fluid, respectively.

In a presently preferred embodiment, the means for bringing the powder to be agglomerated into contact with one or more agglomeration fluids while being directed towards the movable surface, comprises one or more tubings having a substantially annular opening for introduction of the powder to be agglomerated and a tubing positioned centrally within each annular opening for introduction of the agglomeration fluid(s) and optionally an atomizing gas, the centrally positioned tubing ending in an atomizing nozzle at the level of the mouth of the annular opening.

As mentioned above different types of nozzles may be used. However, in a presently preferred embodiment the nozzle is a two fluid nozzle for atomization of a liquid with a gas, the liquid typically being water or an aqueous solution of the powder and the gas typically being air, an inert gas such as nitrogen or steam, either saturated or superheated, or a mixture of one or more of the aforementioned. Steam has the double action of increasing both humidity and temperature.

In order to reduce the risk of soiling of the tubing for introduction of the powder, the atomizing nozzle may be arranged so as to protrude a small distance from the mouth of the surrounding annular opening.

The means for bringing the powder into contact with the agglomeration fluid(s) should be arranged at such distance from the moving surface that the moistened powder hits the surface with a force being adequate for establishing agglomeration without the formed aggregates being destroyed to any unacceptable degree. A suitable distance for a particular product can easily be established by a person skilled in the art.

According to a preferred feature, the distance between the movable surface and the mouth of the means for bringing the powder to be agglomerated into contact with one or more agglomeration fluids while being directed towards the movable surface, is adjustable.

Typically, the means for bringing the powder to be agglomerated into contact with the agglomeration fluid(s) will debouch at a distance of 0.10 m to 1.00 m from the movable surface, such as a distance of 0.20 m to 0.80 m.

The movable surface will typically be substantially impervious to fluids, although a certain porosity may be acceptable in some situations. However from the point of view of obtaining an easy removal of the agglomerated particles from the movable surface, said surface will normally be a smooth, uninterrupted surface. Furthermore the surface may be provided with a coating layer, such as a layer of Teflon®, in order to improve its slip properties.

In a particularly preferred embodiment allowing particularly easy operation and compact construction, the movable surface is the curved surface of a cylinder or drum such as a solid cylinder or a drum with an envelope of steel or other metal, optionally provided with a coating layer for improving the slip properties.

For a cylinder or drum the centrifugal acceleration can be calculated as follows:

$$a_c = r \cdot \omega^2,$$

wherein
$a_c$ is the centrifugal acceleration (m/s$^2$),
r is the radius of the cylinder or drum (m), and
$\omega$ is the angular velocity (s$^{-1}$)
The above equation can be transcribed into:

$$a_c = \frac{D \cdot N_{rpm}^2}{182.56},$$

wherein
$a_c$ is the centrifugal acceleration (m/s$^2$),
D is the diameter of the cylinder or drum (m), and
$N_{rpm}$ is the number of revolutions per minute.
The equation can furthermore be transcribed into:

$$N_{rpm} = 13.51 \cdot \sqrt{\frac{a_c}{D}}$$

The speed of the moving surface, $v_o$, (m/s) can be calculated as follows:

$$v_o = 0.0523 \cdot D \cdot N_{rpm}$$

The cylinder or drum will typically have a diameter in the range from 0.25 m–1.50 m, particularly in the range from 0.35 m–1.00 m, and it will typically e capable of rotating at a speed in the range from 80–2000 rpm, particularly at a speed in the range from 100–1000 rpm.

In general, the movable surface and the means for bringing the powder to be agglomerated into contact with one or more agglomeration fluids while being directed towards said surface are arranged in a housing with said means debauching above said surface. If the movable surface is the curved surface of a cylinder or drum, the means for bringing the powder to be agglomerated into contact with one or more agglomeration fluids while being directed towards said surface will typically be arranged so as to debouch substantially vertically above the axis of rotation or it may be arranged so as to debauch at a small angle, such as an angle of 50–45°, and/or in a small horizontal distance, such as a distance of 1–10 cm upstream in the direction of rotation in order to provide a better catching of the product to be agglomerated. However the means in question may also be placed in other positions around the movable surface, generally in a position between "9 o'clock" and "3 o'clock".

A stream of heated secondary gas will typically be supplied to the housing, i.a. in order to avoid condensation. In case of instant coffee or coffee substitute, ambient air heated to about 55° C. to about 70° C., such as about 60° C., will be suitable. Furthermore, the housing may be provided with an insulating mantle in order to avoid condensation on the walls of the housing.

After having left the moving surface, the agglomerated powder is post-dried as necessary, e.g. on a perforated conveyer belt, a vibrating perforated plate or in a fluid bed such as a VIBRO-FLUIDIZER® which may be located outside the housing or partially or completely within the housing, e.g. as an integrated part of the bottom of the housing. The after-treatment should be carried out in such manner that the formed agglomerates are not damaged to any unacceptable degree.

The dried powder will typically be classified after drying and the undersize product called "fines" recirculated for further agglomeration. Also the oversize product may be recirculated for agglomeration after further processing such as crushing or milling.

If desired, the agglomerated powder may also be classified before the final drying takes place. However, due to the comparatively uniform particle size which may be obtained by the process and apparatus according to the invention, such supplemental wet-classification can be left out in most cases.

Particulate matter entrained in gas streams leaving the housing and possible post-dryers may be separated in cyclones or the like, as is generally known in the art, and recirculated for further processing as desired.

In the following the process and apparatus according to the invention will be described in further detail with reference to specific embodiments which, however, should not be considered as limiting to the scope of the invention.

Figure 2:
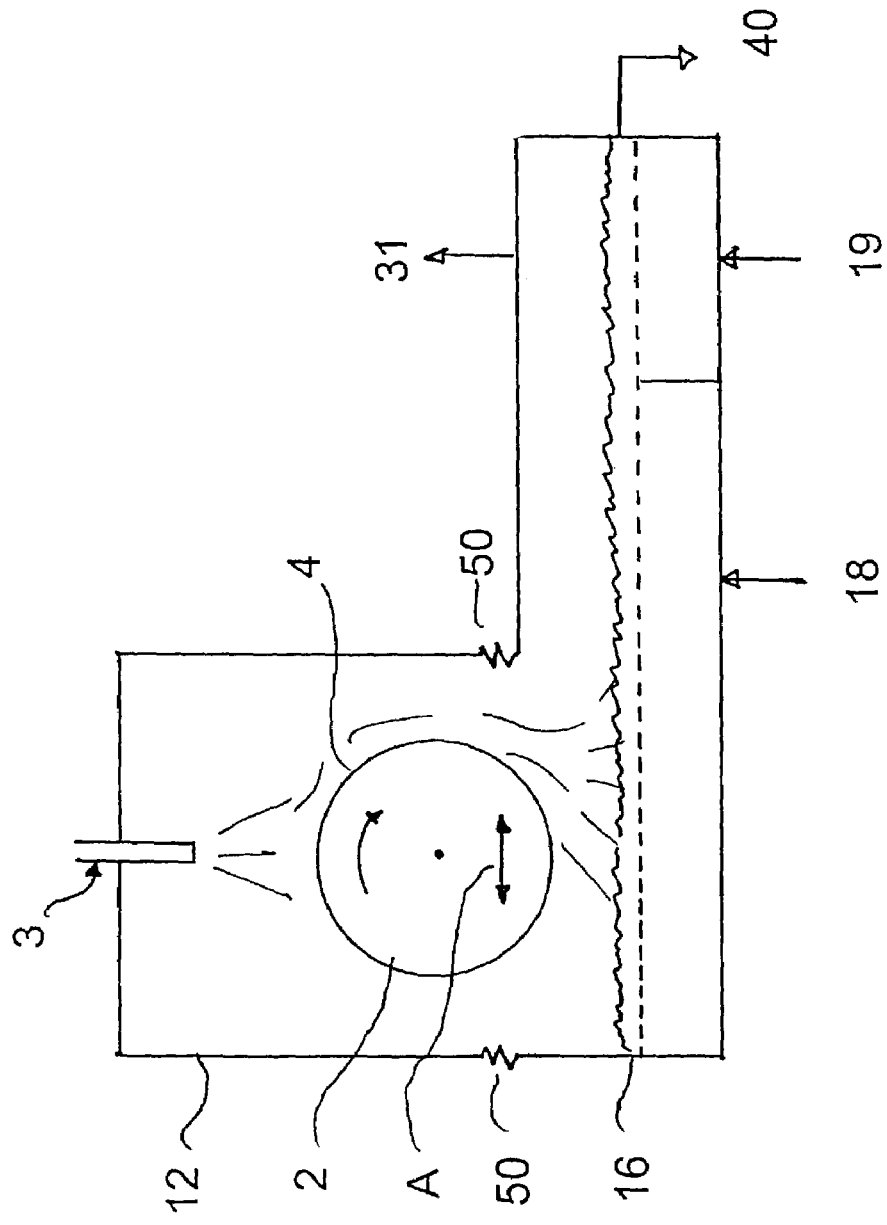
Figure 3:
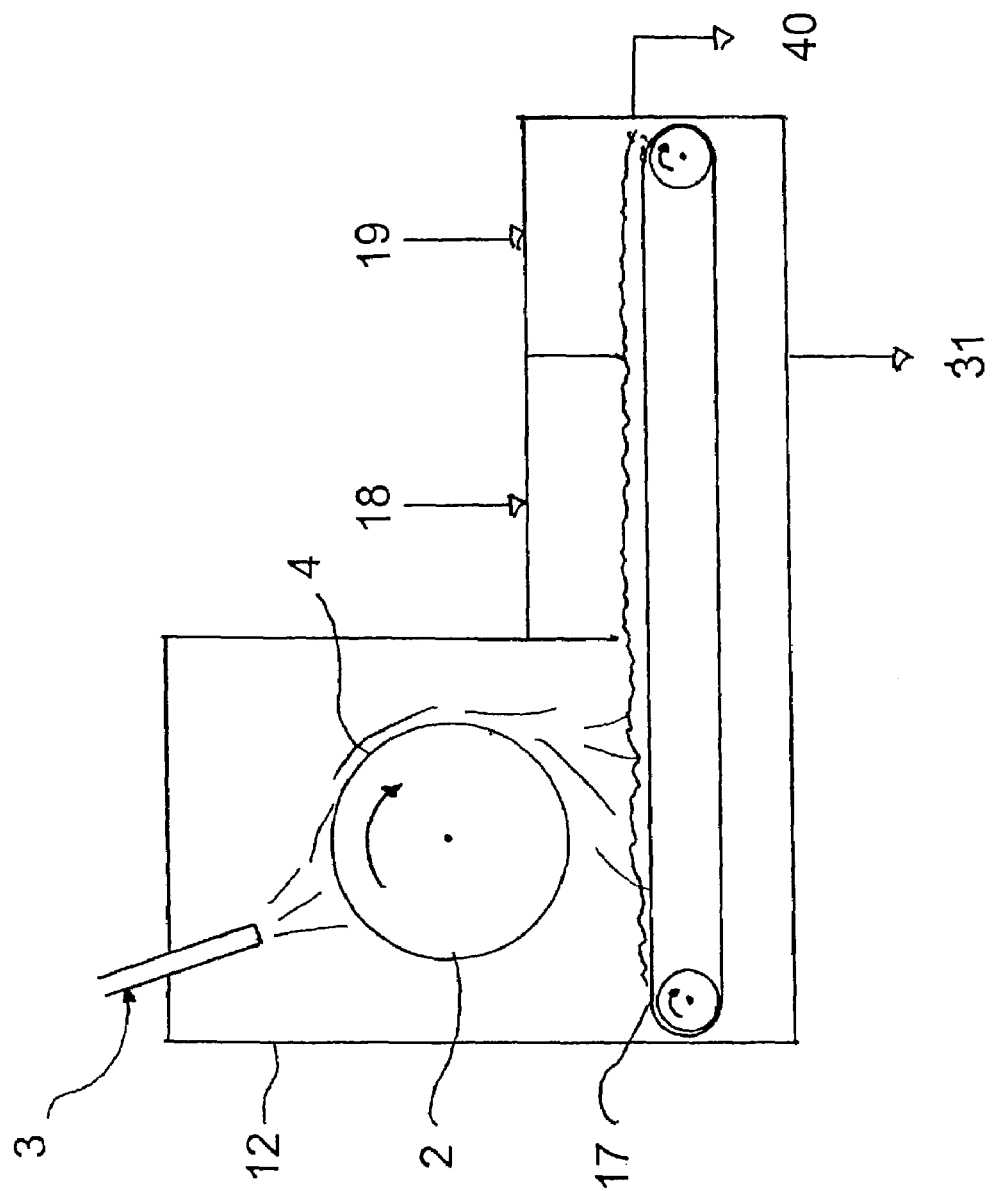

In the drawings,

FIG. 1 is a schematic illustration of an apparatus according to the invention with a fluid bed post-dryer arranged outside the housing, FIG. 2 a schematic illustration of an apparatus according to the invention having an integrated fluid bed for post-drying of the agglomerated powder, and FIG. 3 a schematic illustration of an apparatus according to the invention having an integrated conveyer belt for post-drying of the agglomerated powder.

Referring to FIG. 1, an apparatus indicated generally as 1, for agglomeration of a powder 5, such as coffee or coffee substitute powder, comprises a rotating steel cylinder 2 defining a moving surface 4 and a tubing and nozzle arrangement 3 for bringing the powder 5 to be agglomerated into contact with an agglomeration fluid while being directed towards the moving surface 4. The powder 5 to be agglomerated is introduced through line 6 into tubing 7 having an annular opening, at the end of which it meets water and steam introduced through lines 8 and 9, respectively, into centrally disposed tubing 10 ending in a two fluid nozzle 11 debauching a small distance in front of the mouth of the annular tubing 7. Hereby a superficial wetting of the powder particles with the water and steam introduced as agglomeration fluids is obtained, resulting in the particles forming agglomerates as they are directed towards the moving surface of the rotating cylinder. The cylinder 2 and the tubing and nozzle arrangement 3 are mounted in an insulated housing 12 (insulation not shown), into which heated air is introduced through line 13 for partial drying of the agglomerated particles and avoidance of condensation. The drying air leaves the housing through line 14. The cylinder 2 rotates at such speed that the agglomerated and partially dried powder is moved away from its surface through the influence of centrifugal acceleration.

The agglomerated powder leaves the bottom part of housing 12 via line 15 (possible transfer means not shown) and enters a fluid bed 16 for post-drying, optionally after having passed a not shown sieve. The fluid bed 16 (optionally provided with not shown vibration means) comprises a perforated plate 17 on which a further drying of the agglomerated powder takes place, hot air being introduced through line 18 and cooling air through line 19.

After having left the fluid bed via line 40, the agglomerated powder is classified in sieve 20, product of adequate size being recovered through line 21, fines being recirculated through line 22 and mixed with raw material from silo 23 after having passed cyclone 24, and oversize product being withdrawn via line 25 for further processing as necessary, such as crushing or milling.

Air for conveying the product is introduced through lines 26 and 27. Numerals 28, 29 and 30 indicate blow-through valves. Particulate material entrained in drying gas leaving housing 12 through line 14 and drying gas leaving fluid bed 16 through line 31 is separated in cyclone 32 and combined with raw material from silo 23 via conveyer 33. Air leaves the system through line 34.

In FIG. 2 an embodiment of an apparatus according to the invention having an integrated fluid bed for post-drying of the agglomerated powder is illustrated. As in FIG. 1 the moving surface 4 is the curved surface of a cylinder 2, but in this embodiment the cylinder may be displaced horizontally as indicated by arrow A so as to adjust the point of introduction of the powder relative to the cylinder. The tubing and nozzle arrangement 3 is of the same type as that illustrated in FIG. 1, with the exception that three tubing and nozzle arrangements 3 are placed in line behind each other along the elongated cylinder so as to triple the capacity of the apparatus compared to an apparatus with a single nozzle only. Furthermore the lower portion of the housing 12 is enlarged so as to give room for an integrated fluid bed 16 for post-drying of the agglomerated product. If a vibrated fluid bed is at issue, flexible walls 5d may be provided for connecting the walls of housing 12 to the walls of fluid bed 16. Hot air enters fluid bed 16 at 18 and cooling air at 19. The post-dried and cooled agglomerated product leaves the fluid bed at 40, and the drying gas leaves the fluid bed at 31.

In FIG. 3 an embodiment of an apparatus according to the invention having an integrated conveyer belt for post-drying of the agglomerated powder is illustrated. The moving surface 4 is the curved surface of a drum 2. The tubing and nozzle arrangement 3 is of the same type as that illustrated in FIG. 1, but in the present embodiment it is arranged so as to debouch at an angle corresponding to a position of about 11 o'clock on the drum. The lower portion of the housing is enlarged so as to give room for a perforated conveyer belt 17 on which a post-drying of the agglomerated powder is carried out. As in FIG. 2, hot air is introduced at 18 and cooling air at 19. Drying gas leaves at 31 and cooled agglomerated product at 40.

Examples

Using an apparatus of a similar construction to that illustrated in FIG. 1, a coffee powder and a coffee/chicory powder mix were agglomerated under the conditions indicated in the tabel below.

The diameter of the agglomeration drum was 0.5 m and the distance between the nozzle and the drum was 0.33 m.

Powder to be agglomerated was introduced in an amount of 50 kg/h through the annular opening. The agglomeration fluid was water atomized by steam in a centrally positioned two-fluid nozzle.

The product was post-dried in a three sections fluid bed using two sections for drying and one for final cooling.

The apparatus included 1 mm and 5 mm sieves for undersize product and oversize product, respectively.

TABLE

| Product type | Coffee powder | Coffee/Chicory powder mix |
|---|---|---|
| Drum velocity, rpm | 335 | 560 |
| Drum velocity, m/s | 8.8 | 14.7 |
| Acceleration, m/s$^2$ | 304 | 853 |
| Water rate, l/h | 7.5 | 6.5 |
| Steam temperature, ° C. | 136 | 136 |
| Steam pressure, bar | 2 | 2 |
| Chamber air inlet, ° C. | 64 | 60 |
| Feed powder: | | |
| Moisture content, % | 3.41 | 2.59 |
| BD poured, g/l | 260 | 350 |
| BD tapped 100×, g/l | 300 | 400 |
| Mean particle size, μm | 228 | 218 |
| Product: | | |
| Moisture content, % | 2.12 | 3.49 |
| BD poured, g/l | 180 | 260 |
| BD tapped 100×, g/l | 210 | 310 |
| Mechanical stability, % | 95.5 | 97.5 |
| Particle size distribution: | | |
| % < 500 μm | 20.7 | 21.6 |
| % < 710 μm | 28.1 | 43.6 |
| % < 1000 μm | 42.0 | 85.1 |
| % < 1400 μm | 63.0 | 99.6 |
| % < 2000 μm | 85.5 | 99.9 |
| % < 2800 μm | 99.1 | 99.9 |
| % < 3350 μm | 99.8 | 99.9 |
| Mean particle size, μm | 1152 | 754 |

BD = bulk density

The invention claimed is:

1. A process for agglomeration of powders, comprising the following steps:
   providing a moving surface moving in a curvilinear motion with all parts of said moving surface moving at substantially the same speed; and
   bringing powder to be agglomerated into contact with an agglomeration fluid while being directed towards the moving surface onto which the powder being agglomerated is collected and the powder being agglomerated subsequently moved away from the moving surface by influence of centrifugal force, wherein the agglomerated powder is moved away from the moving surface by means of a centrifugal acceleration of at least 50 m/s$^2$, wherein the moving surface is a curved surface of a cylinder or drum rotating about its central axis.

2. A process according to claim 1, wherein the centrifugal acceleration is in the range from 50–5000 m/s$^2$.

3. A process according to claim 1 or 2, wherein the moving surface is moving at a speed of at least 2.5 m/s.

4. A process according to claim 1, wherein the moving surface is substantially impervious to fluids.

5. A process according to claim 1, wherein the cylinder or drum has a diameter in the range from 0.25 m–1.50 m.

6. A process according to claim 1, wherein the cylinder or drum is rotating at a speed in the range from 80–2000 rpm.

7. A process according to claim 1, wherein the agglomerated powder is classified and fines recirculated for further agglomeration.

8. A process according to claim 1, wherein the powder is coffee and/or coffee substitute powder.

9. An apparatus (1) for agglomeration of powders, said apparatus comprising:
   a movable surface (4) for collection of the powder (5) being agglomerated
   means (3) for bringing the powder to be agglomerated into contact with one or more agglomeration fluids (8, 9) while being directed towards the movable surface (4); and
   means for moving the movable surface,
   wherein the movable surface (4) is configured such that the collected powder (5) being agglomerated is moved away from the moving surface by influence of centrifugal force when the apparatus is in operation, and
   wherein the movable surface (4) is configured such that all parts thereof are moving at substantially the same speed when the apparatus is in operation, and that the apparatus is adapted to provide the collected powder (5) being agglomerated with a centrifugal acceleration of at least 50 M/s$^2$ so as to move it away from the moving surface, wherein the movable surface (4) is the curved surface of a cylinder or drum (2).

10. An apparatus according to claim 9, wherein the centrifugal acceleration in the range from 50–5000 m/s$^2$.

11. An apparatus according to claim 9, wherein the movable surface (4) is substantially impervious to fluids.

12. An apparatus according to claim 9, wherein the cylinder or drum (2) has a diameter in the range from 0.25 m–1.50 m.

13. An apparatus according to claim 9, wherein the moving means rotates the cylinder or drum (2) at a speed in the range from 80–2000 rpm.

14. An apparatus according to claim 9, wherein the means (3) for bringing the powder to be agglomerated into contact with one or more agglomeration fluids (8, 9) while being directed towards the movable surface (4), comprises one or more tubings (7) having a substantially annular opening for introduction of the powder (5) to be agglomerated and a tubing (10) positioned centrally within each annular opening for introduction of the agglomeration fluid(s) and optionally an atomizing gas, the centrally positioned tubing (10) ending in an atomizing nozzle (11) at the level of the mouth of the annular opening.

15. An apparatus according to claim 14, wherein the atomizing nozzle (11) is a two fluid nozzle for atomization of a liquid with a gas.

16. An apparatus according to claim 14 or 15, wherein the atomizing nozzle (11) protrudes a small distance from the mouth of the annular opening.

17. An apparatus according to claim 9, wherein the means (3) for bringing the powder to be agglomerated into contact with one or more agglomeration fluids while being directed towards the movable surface, debouches at a distance of 0.10 m–1.00 m from the movable surface (4).

18. An apparatus according to claim 9, wherein the distance between the movable surface (4) and the mouth of the means (3) for bringing the powder to be agglomerated into contact with one or more agglomeration fluids while being directed towards the movable surface, is adjustable.

19. An apparatus according to claim 9, wherein the speed of the movable surface (4) is adjustable.

20. An apparatus according to claim 9, further comprising a fluid bed (16) for post-drying and cooling of the agglomerated powder.

21. An apparatus according to claim 9, further comprising a conveyer belt (17) for post-drying and cooling of the agglomerated powder.

* * * * *